United States Patent
Wang et al.

(10) Patent No.: US 10,634,032 B2
(45) Date of Patent: Apr. 28, 2020

(54) METHOD AND APPARATUS FOR MONITORING AN EXHAUST AFTERTREATMENT SYSTEM FOR AN INTERNAL COMBUSTION ENGINE

(71) Applicant: GM Global Technology Operations LLC, Detroit, MI (US)

(72) Inventors: Yue-Yun Wang, Troy, MI (US); Raffaello Ardanese, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 15/843,653

(22) Filed: Dec. 15, 2017

(65) Prior Publication Data
US 2019/0186318 A1 Jun. 20, 2019

(51) Int. Cl.
*F01N 3/20* (2006.01)
*F01N 11/00* (2006.01)
(Continued)

(52) U.S. Cl.
CPC ......... *F01N 3/208* (2013.01); *B01D 53/9409* (2013.01); *B01D 53/9418* (2013.01); *B01D 53/9495* (2013.01); *F01N 3/2066* (2013.01); *F01N 11/007* (2013.01); *B01D 53/30* (2013.01); *B01D 2251/2067* (2013.01); *F01N 2560/021* (2013.01); *F01N 2610/02* (2013.01); *F01N 2610/148* (2013.01); *F01N 2610/1453* (2013.01); *F01N 2900/1622* (2013.01); *F01N 2900/1806* (2013.01)

(58) Field of Classification Search
CPC ................ B01D 53/30; B01D 53/9409; B01D 53/9418; B01D 53/9495; B01D 2251/2067; F01N 3/208; F01N 3/2066; F01N 11/007; F01N 2610/02; F01N 2610/148; F01N 2610/1453; F01N 2900/1622; F01N 2900/1806; F01N 2560/021
USPC ................... 60/274, 277, 286, 295, 299–301
See application file for complete search history.

(56) References Cited

U.S. PATENT DOCUMENTS

| | | | |
|---|---|---|---|
| 2008/0178656 A1* | 7/2008 | Nieuwstadt | G01M 15/102 73/23.31 |
| 2010/0101214 A1* | 4/2010 | Herman | F01N 3/208 60/277 |

(Continued)

*Primary Examiner* — Thai Ba Trieu
*Assistant Examiner* — Dapinder Singh
(74) *Attorney, Agent, or Firm* — Quinn IP Law

(57) ABSTRACT

An exhaust aftertreatment system for an internal combustion engine includes a selective catalytic reduction (SCR) device, an injection system disposed to inject reductant into the exhaust pipe upstream of the SCR device. A single ammonia sensor is disposed to monitor an exhaust gas feedstream downstream of the SCR device. A controller is in communication with the single ammonia sensor and the internal combustion engine and operatively is connected to the injection system. The controller includes an instruction set that is executable to monitor, via the single ammonia sensor, a magnitude of ammonia in the exhaust gas feedstream downstream of the SCR device and determine NOx efficiency of the SCR device based upon the magnitude of ammonia in the exhaust gas feedstream downstream of the SCR device. A fault is detected in the SCR device based upon the NOx efficiency.

20 Claims, 2 Drawing Sheets

(51) Int. Cl.
*B01D 53/94* (2006.01)
*B01D 53/30* (2006.01)

(56) References Cited

U.S. PATENT DOCUMENTS

| | | | |
|---|---|---|---|
| 2011/0099985 A1* | 5/2011 | Yasui | F01N 3/208 60/287 |
| 2011/0131956 A1* | 6/2011 | Yasui | F01N 3/206 60/277 |
| 2011/0219747 A1* | 9/2011 | Geveci | F01N 3/208 60/274 |
| 2012/0085082 A1* | 4/2012 | Levijoki | F01N 3/208 60/274 |
| 2016/0201541 A1* | 7/2016 | Matsumoto | F01N 3/2066 422/105 |

* cited by examiner

METHOD AND APPARATUS FOR MONITORING AN EXHAUST AFTERTREATMENT SYSTEM FOR AN INTERNAL COMBUSTION ENGINE

INTRODUCTION

Internal combustion engines fluidly couple to exhaust aftertreatment systems that purify exhaust gases generated as byproducts of combustion. Byproducts of combustion may include unburned hydrocarbons, carbon monoxide, nitrides of oxide, often referred to as NOx molecules, and particulate matter. Exhaust aftertreatment systems may include oxidation catalysts, reduction catalysts, selective catalytic reduction catalysts and particulate filters. Selective catalytic reduction catalysts may employ reductants for reducing NOx molecules to elemental nitrogen. The reductants may be stored on a surface or otherwise captured in selective catalytic reduction catalysts prior to being consumed as part of NOx reduction.

SUMMARY

An exhaust aftertreatment system for an internal combustion engine is described, and includes a selective catalytic reduction (SCR) device fluidly coupled to an exhaust pipe of the internal combustion engine and an injection system disposed to inject reductant into the exhaust pipe upstream of the SCR device. A single ammonia sensor is disposed to monitor an exhaust gas feedstream downstream of the SCR device. A controller is in communication with the single ammonia sensor and the internal combustion engine and operatively is connected to the injection system. The controller includes an instruction set that is executable to monitor, via the single ammonia sensor, a magnitude of ammonia in the exhaust gas feedstream downstream of the SCR device and determine NOx efficiency of the SCR device based upon the magnitude of ammonia in the exhaust gas feedstream downstream of the SCR device. A fault is detected in the SCR device based upon the NOx efficiency.

An aspect of the disclosure includes the controller including an instruction set that is executable to command the injection system to inject reductant into the exhaust pipe upstream of the SCR device and monitor, via the single ammonia sensor, a magnitude of ammonia in the exhaust gas feedstream downstream of the SCR device. A parameter associated with emissions performance of the SCR device is determined based upon the magnitude of ammonia in the exhaust gas feedstream downstream of the SCR device, and a fault in the SCR device is determined based upon the parameter associated with emissions performance.

Another aspect of the disclosure includes the instruction set being executable to integrate the magnitude of ammonia in the exhaust gas feedstream downstream of the SCR device monitored by the single ammonia sensor.

Another aspect of the disclosure includes the instruction set being operable to execute a catalyst fault model, wherein the catalyst fault model determines an expected ammonia output from the SCR device with the SCR device being deteriorated to a level that is associated with a fault threshold. The expected ammonia output from the SCR device from the catalyst fault model with the SCR device being deteriorated to a level that is associated with a fault threshold is integrated, and the integrated magnitude of ammonia in the exhaust gas feedstream is compared with the integrated expected ammonia output from the SCR device that is derived from the catalyst fault model. A fault in the SCR device is detected when the integrated magnitude of ammonia in the exhaust gas feedstream is greater than the integrated expected ammonia output from the SCR device that is derived from the catalyst fault model.

Another aspect of the disclosure includes the catalyst fault model being developed with the SCR device having an ammonia storage capacity that is at a threshold level associated with NOx conversion efficiency that is associated with a maximum permissible NOx emissions level.

Another aspect of the disclosure includes the instruction set being executable to monitor engine operation to determine an engine-out NOx rate, determine a reductant flowrate based upon the command to the injection system to inject reductant, and determine an ammonia coverage ratio and ammonia storage capacity for the SCR device based upon the commanded reductant flowrate, the engine-out NOx rate and the output signal from the ammonia sensor.

Another aspect of the disclosure includes the instruction set being executable to compare the estimated ammonia storage capacity for the SCR device with a threshold ammonia storage capacity, and detect a fault in the SCR device when the estimated ammonia coverage ratio and ammonia storage capacity for the SCR device is less than the threshold ammonia storage capacity.

Another aspect of the disclosure includes the instruction set including a Kalman filter configured to generate estimates for the ammonia coverage ratio and the ammonia storage capacity based upon the commanded reductant flowrate, the engine-out NOx rate and the output signal from the ammonia sensor.

Another aspect of the disclosure includes the instruction set being executable to determine an amount of ammonia consumed in the SCR device and determine an actual amount of NOx reduced in the SCR device based upon the amount of ammonia consumed in the SCR device.

Another aspect of the disclosure includes the instruction set being executable to determine a fault-related amount of NOx reduced in the SCR device when the SCR device is operating at a fault state, and compare the fault-related amount of NOx and the actual amount of NOx reduced in the SCR device.

An aspect of the disclosure includes the instruction set being further executable to monitor engine operation, determine engine-out NOx emissions based upon the monitored engine operation and determine NOx efficiency of the SCR device based upon the engine-out NOx emissions and the magnitude of ammonia in the exhaust gas feedstream downstream of the SCR device.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein. As employed herein, the term "upstream" and related terms refer to elements that are towards an origination of a flow stream relative to an indicated location, and the term "downstream" and related terms refer to elements that are away from an origination of a flow stream relative to an indicated location.

Figure 1:
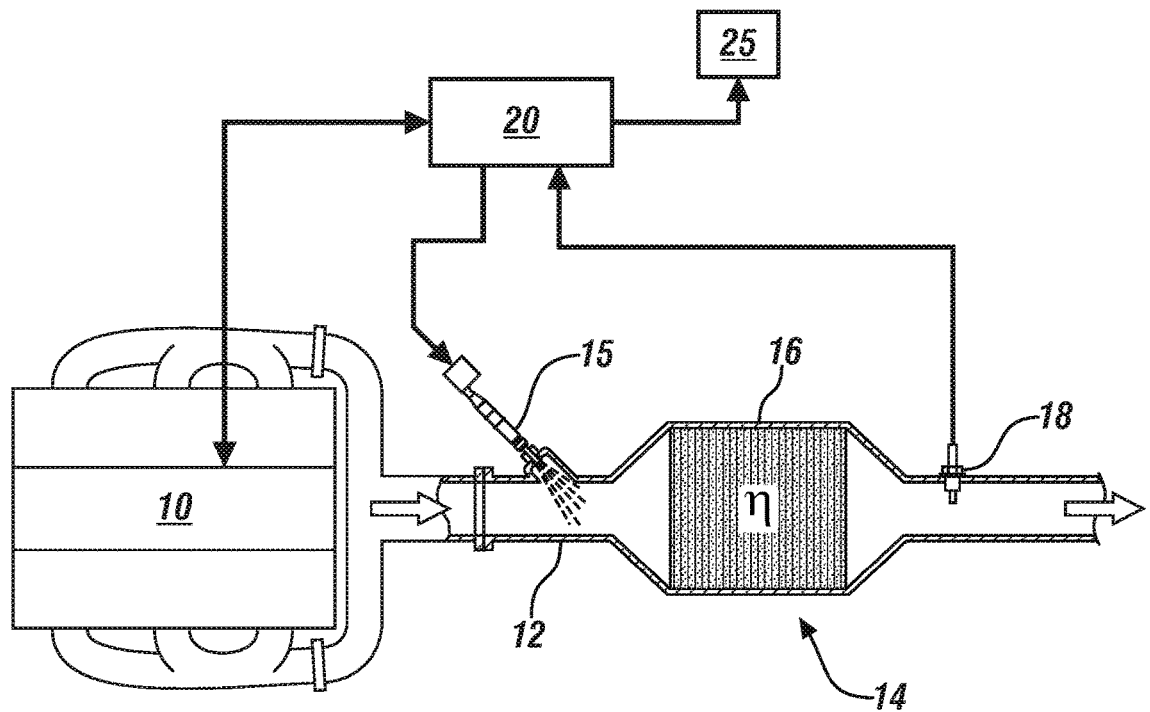
FIG. 1 schematically illustrates an internal combustion engine that is fluidly coupled to an exhaust aftertreatment system composed of a selective catalytic reduction (SCR) device, in accordance with the disclosure.

Referring to the drawings, wherein like reference numerals correspond to like or similar components throughout the several Figures, FIG. 1, consistent with embodiments disclosed herein, schematically illustrates an internal combustion engine (engine) 10 that is fluidly coupled via an exhaust pipe 12 to an exhaust aftertreatment system 14. The engine 10 is a multi-cylinder internal combustion engine that combusts a mixture of directly-injected fuel, intake air and recirculated exhaust gas to generate mechanical power. The engine 10 is configured as a compression-ignition engine as shown, although the concepts described herein may be employed on other engine configurations that employ embodiments of the exhaust aftertreatment system 14 described herein. The engine 10 may be employed on a ground vehicle, e.g., a passenger car, truck, agricultural vehicle or a construction vehicle, on a marine vehicle, or in a stationary setting, e.g., coupled to an electric power generator.

The engine 10 may include a multi-cylinder engine block, an intake manifold for channeling intake air to the cylinders, and an exhaust manifold for entraining exhaust gas for channeling through the exhaust pipe 12 to the exhaust aftertreatment system 14. Other unillustrated engine components and systems include pistons, crankshaft, engine head(s), intake valves, exhaust valves, camshaft(s), and variable cam phasers when employed. The engine 10 preferably operates in a four-stroke combustion cycle of repetitively-executed strokes of intake-compression-combustion-exhaust. The engine 10 may include an exhaust gas recirculation (EGR) system that fluidly channels exhaust gas from the exhaust manifold to the intake manifold.

An engine controller 20 is configured to monitor various sensing devices and execute control routines to command various actuators to control operation of the engine 10 in response to operator commands. Operator commands may be determined from various operator input devices, including, e.g., an accelerator pedal and a brake pedal. The engine controller 20 is configured to communicate with a Human-Machine Interface (HMI) device 25 to effect communication with the vehicle operator. The HMI device 25 may be executed as a dashboard lamp in one embodiment. The HMI device 25 provides for human/machine interaction, including providing information to the operator including status of vehicle systems, service and maintenance information.

The exhaust aftertreatment system 14 includes a plurality of fluidly connected exhaust purifying devices for purifying engine exhaust gas prior to expulsion to ambient air. An exhaust purifying device may be any device that is configured to oxidize, reduce, filter and/or otherwise treat constituents of the exhaust gas feedstream, including but not limited to hydrocarbons, carbon monoxide, nitrides of oxygen (NOx), and particulate matter. In the embodiment shown, a single exhaust purifying device is deployed, and is configured as a selective-catalyst reduction (SCR) device 16. Other exhaust purifying devices may be deployed, including, e.g., an oxidation catalyst for oxidizing hydrocarbons and other constituents in the exhaust gas feedstream and/or a particulate filter.

A reductant delivery system 15 including an injection nozzle may be positioned upstream relative to the SCR device 16, and is operatively connected to the controller 20 to controllably supply reductant into the exhaust gas feedstream to facilitate NOx reduction in the SCR device 16. In one embodiment, the SCR device 16 may be a urea-based device, and the injected reductant may be urea. As appreciated by those skilled in the art, urea may convert to ammonia (NH3), which may be stored on the substrates of SCR device 16, and may react with and reduce NOx molecules to form elemental nitrogen (N2) and other inert gases.

In one embodiment, the SCR device 16 includes a ceramic or metallic substrate having flow channels that have been coated with suitable materials including, by way of non-limiting examples: platinum-group metals such as platinum, palladium and/or rhodium; other metals, such as copper; cerium; and other materials. The coated materials effect chemical reactions to oxidize, reduce, filter or otherwise treat constituents of the exhaust gas feedstream under certain conditions related to temperature, flowrate, air/fuel ratio and others. Various arrangements of elements of the exhaust aftertreatment system 14 may be employed within the scope of this disclosure, with such arrangements including the addition of other exhaust purifying devices and/or omission of one or more of the exhaust purifying devices, depending upon requirements of the specific application.

Sensors for monitoring the exhaust purifying devices of the exhaust aftertreatment system 14 include an ammonia sensor 18 that is deployed to monitor the exhaust gas feedstream downstream of the SCR device 16. In one embodiment, no exhaust gas monitoring sensor is deployed in the exhaust aftertreatment system 14 upstream of the SCR device 16. One or multiple exhaust gas sensors or temperature sensors may be disposed downstream of the SCR device 16.

Engine control includes controlling various engine operating parameters, including controlling preferred engine control states to minimize various exhaust gas constituents through chemical reaction processes that include, by way of non-limiting examples, oxidation, reduction, filtering, and selective reduction.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium. The term 'model' refers to a processor-based or processor-executable code and associated calibration that simulates a physical existence of a device or a physical process. As used herein, the terms 'dynamic' and 'dynamically' describe steps or processes that are executed in real-time and that may include monitoring or otherwise determining states of parameters and updating the states of the parameters during execution of a routine or between iterations of execution of the routine.

The terms "calibration", "calibrate", and related terms refer to a result or a process that compares an actual or standard measurement associated with a device with a perceived or observed measurement or a commanded position. A calibration as described herein can be reduced to a storable parametric table in the form of an array, a plurality of executable equations or another suitable form. A parameter is defined as a measurable quantity that represents a physical property of a device or other element that is discernible using one or more sensors and/or a physical model. A parameter can have a discrete value, e.g., either "1" or "0", or can be infinitely variable in value.

The concepts described herein relate to a method for monitoring an embodiment of the SCR device 16 to detect occurrence of a decrease in emissions performance that may be associated with deterioration of the SCR device 16. The emissions performance is evaluated based upon an estimate of NOx reduction and/or ammonia storage capacity, wherein monitoring is accomplished employing only the ammonia sensor 18 disposed downstream of the SCR device 16 and without employing another sensing device upstream of the SCR device 16 that would otherwise provide measured parameters for purposes of comparison with monitored parameters from the downstream ammonia sensor 18. As such, the exhaust aftertreatment system 14 can be implemented without an exhaust gas monitoring sensor being disposed upstream of the SCR device 16. Instead, the upstream portion of the exhaust gas feedstream and the SCR device 16 are evaluated employing dynamically executed physics-based models. The results of the monitoring and associated modelling are employed to detect a change in a parameter that indicates deterioration of the SCR device 16. The method for monitoring to detect a change in a parameter that is associated with deterioration of emissions performance related to operation of the SCR device 16 can be advantageously executed in the controller 20 as algorithmic code, calibrations, and other elements. A parameter associated with the NOx efficiency of the SCR device 16 is determined based upon the magnitude of ammonia in the exhaust gas feedstream downstream of the SCR device 16. A fault associated with the SCR device 16 can be determined based upon the NOx efficiency. A reduction in the ammonia storage capacity is correlatable to a reduction in NOx efficiency in the SCR device 16. Thus, signal inputs from the downstream ammonia sensor 18 may be employed to monitor the SCR device 16 and detect occurrence of an associated fault. When occurrence of a fault associated with the SCR device 16 is detected, it may be communicated by the controller 20 to the HMI device 25, which serves to inform a vehicle operator of a need for engine service.

Figure 2:
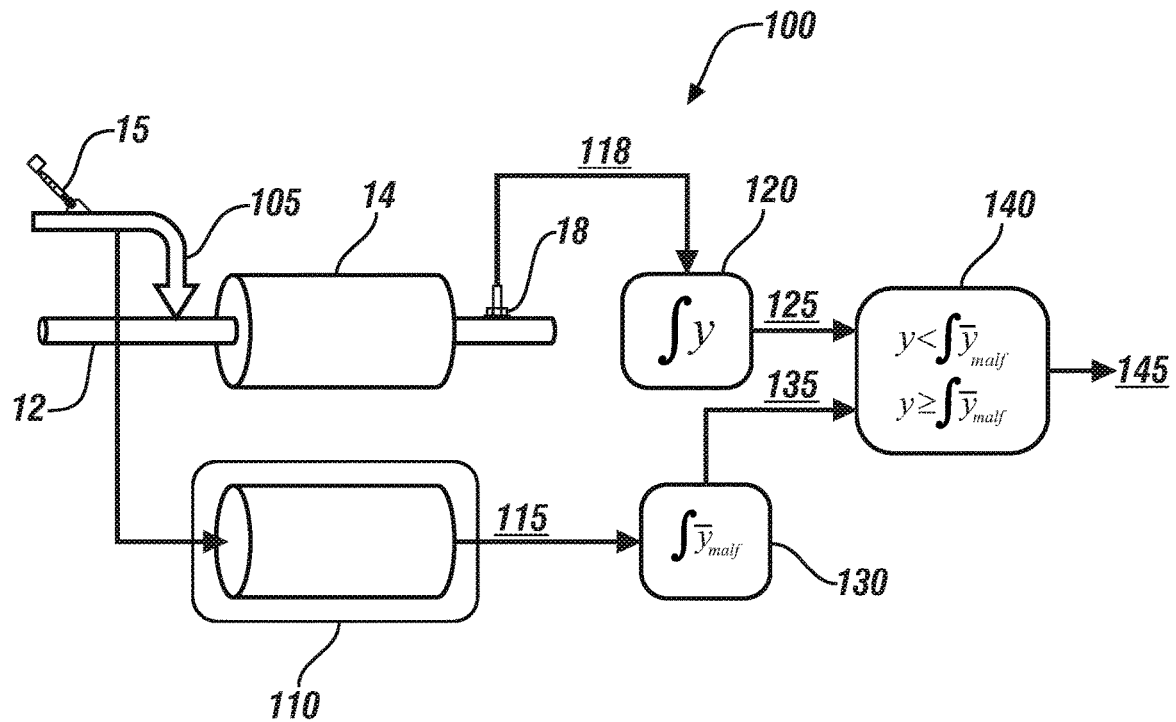
FIG. 2 schematically shows a routine for monitoring to detect a change in a parameter that is associated with deterioration of emissions performance related to operation of an embodiment of the SCR device, wherein the monitoring is based upon a time-integration of ammonia slip, in accordance with the disclosure.

FIG. 2 schematically shows a first routine 100 for monitoring to detect a change in a parameter that is associated with deterioration of emissions performance related to operation of an embodiment of the SCR device 16, wherein monitoring is accomplished employing only the ammonia sensor 18 disposed downstream of the SCR device 16, and wherein the upstream portion of the exhaust gas feedstream and the SCR device 16 are evaluated employing dynamically executed physics-based models. The single ammonia sensor 18 is employed to determine a magnitude of ammonia in the exhaust gas feedstream downstream of the SCR device 16, and NOx efficiency of the SCR device 16 is determined based upon the magnitude of ammonia. A fault in the SCR device 16 can be determined based upon a decrease in the ammonia storage capacity, which results in a corresponding decrease in NOx conversion efficiency.

During operation of the internal combustion engine 10, the reductant injection system injects reductant at a commanded reductant flowrate 105, and the ammonia sensor 18 generates an ammonia signal 118 that correlates to a magnitude of ammonia in the exhaust gas feedstream downstream of the SCR device 16. The ammonia signal 118 is input to a first integrator 120, which generates a first integration term 125, i.e., ∫y, employing a moving average integration method or another integration method.

Simultaneously, engine operating parameters and control parameters for the reductant injection system 15 are provided to a catalyst fault model 110. The control parameters for the reductant injection system 15 include the commanded reductant flowrate 105. The catalyst fault model 110 predicts an expected ammonia output 115 from the SCR device 16 when the SCR device 16 has deteriorated to a level that is associated with a fault threshold. The expected ammonia output 115 is input to a second integrator 130, which generates a second integration term 135, i.e., ∫$y_{malf}$ employing a moving average integration method or another integration method. Preferably, the first and second integrators 120, 130 employ the same integration methodology. A comparator 140 evaluates the first and second integration terms 125, 135, and generates an output 145 that indicates whether a fault has occurred. The output 145 indicates occurrence of a fault associated with the SCR device 16 when the first integration term 125, based upon the measured ammonia signal 118, is greater than the second integration term 135, which is associated with the catalyst fault model 110, taking into account the modeled deterioration and the magnitude of the injected reductant.

The catalyst fault model 110 is based upon a nominal catalyst model, which can be expressed as follows in EQ. 1.

$$\begin{cases} \dot{C}_{NOx} = \frac{1}{V}(FC_{NO_x,in} - FC_{NO_x} - r_{RED}C_{NO_x}\Theta\theta) \\ \dot{\theta} = \frac{r_{ADS}C_{NH_3}}{FM_{WNH_3}}(1-\theta) - r_{DES}\theta - \frac{r_{RED}C_{NO_x}}{FM_{WNO_x}}\theta - r_{OXY}\theta \\ \dot{C}_{NH_3} = \frac{1}{V}(FC_{NH3,in} - FC_{NH3} - r_{ADS}\Theta C_{NH_3}(1-\theta) + r_{DES}FM_{WNH_3}\Theta\theta) \end{cases} \quad [1]$$

The terms include as follows:

$C_{NO_x,in}$, which represents an engine-out NOxflr into the SCR device;

$C_{NO_x}$, which represents NOx flr out of the SCR device;

θ, which represents an ammonia coverage ratio;

Θ, which represents an ammonia storage capacity;

F, which represents a volumetric flowrate of the exhaust gas feedstream;

$C_{NH_3}$, which represents ammonia slip out of the SCR device;

$C_{NH_3,in}$, which represents the injected ammonia flowrate into the SCR device;

V, which represents volume of the SCR device;

$M_{WNH_3}$, which represents ammonia molecular weight;

$M_{WNO_x}$, which represents NOx molecular weight;

$\dot{C}_{NH_3}$, which is NH3 (ammonia) flowrate (g/s); $\dot{C}_{NO_x}$, which is NOx flowrate (g/s); and $\dot{\theta}$, which is a time-rate change in the ammonia coverage ratio. Other model parameters include $r_{RED}$, which is a NOx reduction rate; $r_{ADS}$, which is a NOx adsorption rate; $r_{DES}$, which is a NH3 desorption rate; and $r_{OXY}$, which is an ammonia oxidation rate. The model parameters are determined based upon catalyst temperature, gas constants and activation energy.

The catalyst fault model 110 can be expressed as follows in EQ. 2:

$$\begin{cases} \dot{C}_{NOx} = \frac{1}{V}(FC_{NO_x,in} - FC_{NO_x} - r_{RED}C_{NO_x}\Theta_{OBD}\theta) \\ \dot{\theta} = \frac{r_{ADS}C_{NH_3}}{FM_{WNH_3}}(1-\theta) - r_{DES}\theta - \frac{r_{RED}C_{NO_x}}{FM_{WNO_x}}\theta - r_{OXY}\theta \\ \dot{C}_{NH_3} = \frac{1}{V}(FC_{NH3,in} - FC_{NH3} - r_{ADS}\Theta_{OBD}C_{NH_3}(1-\theta) + r_{DES}FM_{WNH_3}\Theta_{OBD}\theta) \end{cases} \quad [2]$$

The terms associated with EQ. 2 include terms in common with those terms that are employed in EQ. 1 and the following terms that are associated with the catalyst fault model 110. The other terms include $\Theta_{OBD}$, which represents an ammonia storage capacity that has decreased to a threshold level at which a fault is indicated due to a corresponding decrease in NOx conversion efficiency. In one embodiment, the threshold decrease in NOx conversion efficiency is associated with an increase in NOx emissions to a maximum permissible NOx emissions level that is 1.5 times the regulated standard for NOx emissions.

Figure 3:
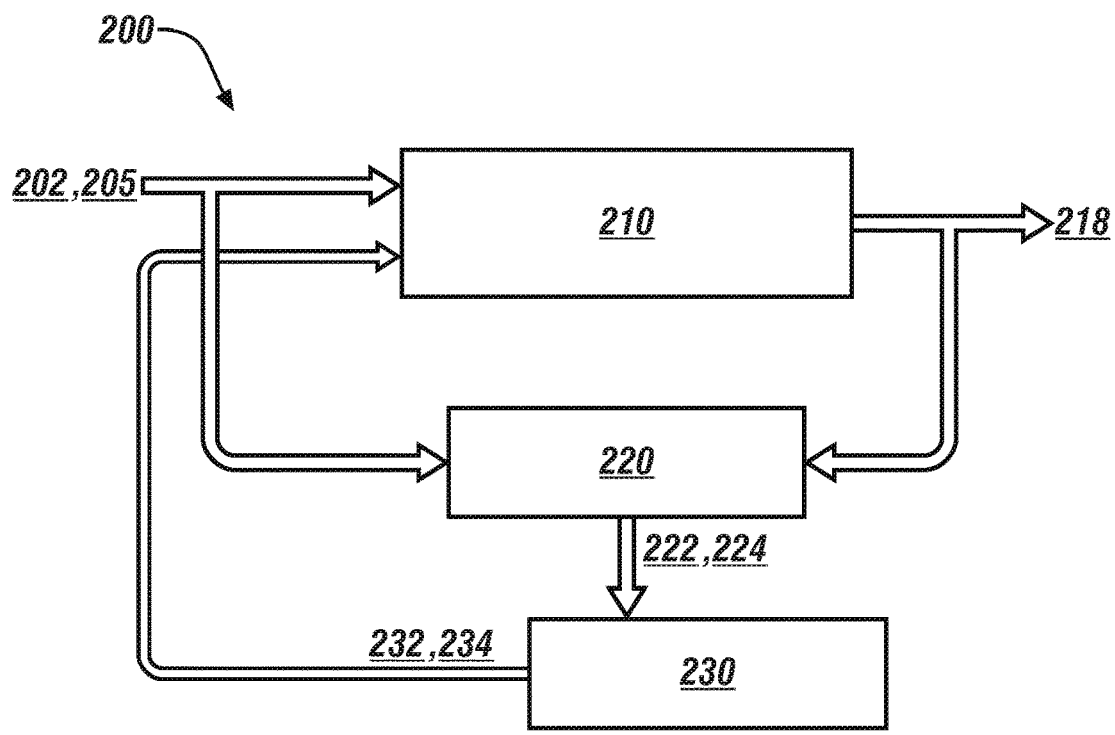
FIG. 3 schematically shows a routine for monitoring to detect a change in a parameter that is associated with deterioration of emissions performance related to operation of an embodiment of the SCR device, wherein the monitoring is based upon execution of a state-space model and a Kalman Filter, in accordance with the disclosure.

FIG. 3 schematically shows a second routine 200 for monitoring to detect a change in a parameter that is associated with deterioration of emissions performance related to operation of an embodiment of the SCR device 16, wherein monitoring is accomplished employing only the ammonia sensor 18 disposed downstream of the SCR device 16, and wherein the upstream portion of the exhaust gas feedstream and the SCR device 16 are evaluated employing dynamically executed physics-based models. The single ammonia sensor 18 is employed to determine a magnitude of ammonia in the exhaust gas feedstream downstream of the SCR device 16, and NOx efficiency of the SCR device 16 is determined based upon the magnitude of ammonia. Again, a fault in the SCR device 16 can be determined based upon a decrease in the ammonia storage capacity, which results in a corresponding decrease in NOx conversion efficiency.

The second routine 200 includes an ammonia storage state-space model 210, an Extended Kalman Filter 220 and an estimator 230, wherein the Extended Kalman Filter 220 is constructed to estimate the NH3 storage capacity of the SCR device 16.

The inputs to the ammonia storage state-space model 210 and the Extended Kalman Filter 220 include a commanded reductant flowrate 205 and an engine-out NOx rate 202, which can be estimated or otherwise determined based upon an engine operating model. The ammonia signal 118 is output from ammonia sensor 18, i.e., $y_{sen}$, and correlates to magnitude of ammonia in the exhaust gas feedstream downstream of the SCR device 16.

The second routine 200 defines a second-order SCR model, which is defined by EQS. 3 and 4. EQ. 3 describes the ammonia coverage ratio relationship and EQ. 4 describes a discrete ammonia storage capacity equation, assuming the storage capacity changes slowly. EQS. 3 and 4 can be employed to calculate catalyst NOx conversion efficiency $\hat{\eta}(k)$, and NH3 conversion efficiency $\hat{\xi}(k)$ at sample time k, which can be employed to predict SCR outlet NOx and NH2 slip $y_1(k)$ and $y_2(k)$, respectively. These values are used to update the second-order SCR model, then execute the Kalman filter estimation again to estimate an ammonia coverage ratio $\hat{\theta}$ and the ammonia storage capacity $\hat{\Theta}$ of the SCR device 16. A Kalman Filter is constructed to estimate aging of the ammonia storage capacity $\Theta$, in order to detect a catalyst malfunction when the ammonia storage capacity $\Theta$ is reduced in capacity to a fault threshold capacity $\Theta_{OBD}$, i.e., $\hat{\Theta}<\Theta_{OBD}$.

The ammonia storage state-space model 210 can be expressed as follows in EQS. 3 and 4, wherein EQ. 3 can be executed to determine ammonia coverage ratio, as follows.

$$\frac{\theta(k+1)-\theta(k)}{dt} = \quad [3]$$
$$-(r_{OXY}+r_{DES})\theta - r_{RED}\theta(1-\hat{\eta})u_1 + r_{ADS}(1-\theta)(1-\hat{\xi})u_2$$

EQ. 4 describes a maximum ammonia storage capacity relationship, as follows, assuming the storage capacity changes slowly.

$$\Theta(k+1)=\Theta(k) \quad [4]$$

An observer equation is provided to determine the expected output from the ammonia sensor 18 ($y_{sen}$), as follows in EQ. 5.

$$y_{sen}(k+1) - ay_{sen}(k) + b\frac{r_{DES}\Theta\theta + Qu_2}{Q + r_{ADS}\Theta(1-\theta)} \quad [5]$$

The terms associated with EQS. 3, 4 and 5 include terms in common with those terms that have been previously defined, and the following terms:

$\theta$, which represents an ammonia coverage ratio;

$\Theta$, which represents an ammonia storage capacity;

$\hat{\eta}$, which represents an estimate of NOx conversion efficiency;

$\hat{\xi}$, which represents an estimate of ammonia conversion efficiency;

$u_1$, which represents engine-out NOx emissions, i.e., the magnitude of NOx flow entering the SCR 16;

$u_2$, which represents the commanded reductant flowrate 205;

Q, which represents space velocity of the exhaust flow entering the SCR device 16;

k indicates a sample time that is associated with the present iteration; and k+1 indicates a sample time that is associated with the next iteration.

Based on EQS. 3, 4 and 5, a standard linear time-varying Kalman filter can be applied to estimate ammonia coverage ratio and maximum ammonia storage capacity, $\theta$ and $\Theta$, respectively. The Extended Kalman Filter 220 generates estimates for an ammonia coverage ratio $\hat{\theta}$ 222 and ammonia storage capacity $\hat{\Theta}$ 224 based upon inputs that include the commanded reductant flowrate 205, the engine-out NOx rate 202 and the ammonia signal 118 that is output from ammonia sensor 18, i.e., $y_{sen}$. The Extended Kalman Filter 220 is composed of a set of mathematical equations that implement a predictor-corrector type estimator that is optimal in the sense that it minimizes an estimated error covariance when some conditions are met.

The estimates for ammonia coverage ratio $\hat{\theta}$ 222 and ammonia storage capacity $\hat{\Theta}$ 224 are input to the estimator 230, which can determine estimated values for ammonia conversion efficiency $\hat{\xi}(k)$ 232 and NOx conversion efficiency $\hat{\eta}$ 234, as follows in EQ. 6.

$$\hat{\eta}(k) = \frac{r_{RED}\hat{\Theta}\hat{\theta}}{Q + r_{RED}\hat{\Theta}\hat{\theta}}, \quad [6]$$

$$\hat{\xi}(k) = 1 - \frac{r_{DES}\hat{\Theta}\hat{\theta} + Qu_2}{(Q + r_{ADS}\hat{\Theta}(1-\hat{\theta}))u_2}$$

The terms associated with EQ. 6 include terms in common with those terms that have been previously defined, and the following terms:

$\hat{\theta}$, which represents the estimated ammonia coverage ratio; and $\hat{\Theta}$, which represents the estimated ammonia storage capacity.

The estimated values for ammonia conversion efficiency $\hat{\xi}(k)$ 232 and NOx conversion efficiency $\hat{\eta}$ 234 are provided to the ammonia storage state-space model 210 and employed in EQS. 3, 4 and 5 to determine values for the ammonia storage capacity $\Theta$, which can be evaluated. When the estimated ammonia storage capacity $\Theta$ decreases to a level that is less than or equal to $\Theta_{OBD}$, a fault can be indicated. Again, the $\Theta_{OBD}$ term represents an ammonia storage capacity that has decreased to a threshold level at which a fault associated with the SCR device 16 is indicated due to a corresponding decrease in the NOx conversion efficiency. In one embodiment, the threshold decrease in NOx conversion efficiency is associated with an increase in NOx emissions to a maximum permissible NOx emissions level that is 1.5 times the regulated standard for NOx emissions.

Figure 4:
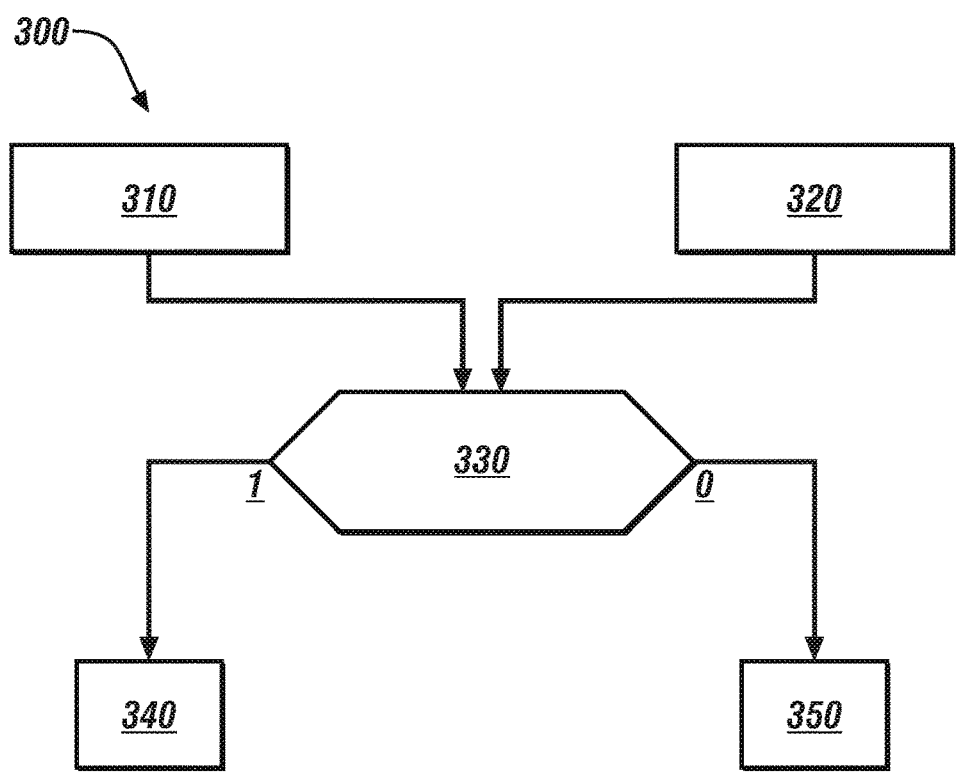
FIG. 4 schematically shows a routine for monitoring to detect a change in a parameter that is associated with deterioration of emissions performance related to operation of an embodiment of the SCR device, wherein the monitoring is based upon a mass-balance relationship, in accordance with the disclosure.

FIG. 4 schematically shows a third routine 300 for monitoring to detect a change in a parameter that is associated with deterioration of emissions performance that is related to operation of an embodiment of the SCR device 16, wherein monitoring is accomplished employing only the ammonia sensor 18 disposed downstream of the SCR device 16, and wherein the upstream portion of the exhaust gas feedstream and the SCR device 16 are evaluated employing dynamically executed physics-based models. The single ammonia sensor 18 is employed to determine a magnitude of ammonia in the exhaust gas feedstream downstream of the SCR device 16, and NOx efficiency of the SCR device 16 is determined based upon the magnitude of ammonia. Again, a fault in the SCR device 16 can be determined based upon a decrease in the ammonia storage capacity, which results in a corresponding decrease in NOx conversion efficiency.

The third routine 300 includes monitoring operation and executing mass balance equations to determine whether the amount of NOx that is consumed, i.e., reduced to elemental nitrogen and other elements, indicates that the SCR device 16 is functioning according to specification. The basis for the mass balance equations is that there is a correlation between NOx consumption and ammonia consumption. One governing assumption is that 1 mole of NOx consumes 1 mole of NH3 during NOx reduction. Thus, a determination, via a mass balance equation, indicating the amount of NH3 that is consumed translates directly to a determination of the amount of NOx that has been reduced. Details of this operation include as follows.

A first step includes determining an actual amount of NOx that is consumed $NOx_{consumed}|actual$ during operation under the present conditions with the SCR device 16 operating in its actual, unknown state, employing a mass-balance equation, as follows in EQ. 7 (310).)

$$NOx_{consumed}|actual = \theta_{ini}\Omega + \Sigma NH3_{inj} - \theta_{end}\Omega - \Sigma NH3_{slip} - \Sigma r_{OXY}\theta \quad [7]$$

The terms associated with EQ. 7 include terms in common with those terms that have been previously defined, and the following terms:

$\theta_{ini}$, which represents an initial ammonia coverage ratio at the start of the test;

$\theta_{end}$, which represents a final ammonia coverage ratio at the end of the test;

$\theta$, which represents an ammonia coverage ratio;

$NH3_{inj}$, which represents an amount of injected ammonia from the reductant delivery system 15 to facilitate NOx reduction in the SCR device 16;

$NH3_{slip}$, which represents the predicted NH3 slip that is derived from the the input from the ammonia signal 118 that is output from ammonia sensor 18, and correlates to a magnitude of ammonia in the exhaust gas feedstream downstream of the SCR device 16;

$\Theta$, which represents the ammonia storage capacity.

A second step executes simultaneously with the first step, and includes determining a fault-related amount of NOx ($NOx_{consumed}|fault$) that is consumed during operation under the present conditions with the SCR device 16 operating at a fault state, also employing a mass-balance equation that is analogous to EQ. 7, as follows in EQ. 8 (320).

$$NOx_{consumed}|fault = \theta_{ini}^{obd}\Omega_{OBD} + \Sigma NH3_{inj} - \theta_{end}^{obd}\Omega_{OBD} - \Sigma NH3_{slip} - \Sigma r_{OXY}\theta^{obd} \quad [8]$$

The terms associated with EQ. 8 include terms in common with those terms that have been previously defined, and the following terms:

$\theta_{ini}^{obd}$, which represents an initial ammonia coverage ratio at the start of the test;

$\theta_{end}^{obd}$, which represents a final ammonia coverage ratio at the end of the test;

$\theta^{obd}$ which represents an ammonia coverage ratio;

$NH3_{inj}$, which represents an amount of injected ammonia from the reductant delivery system 15 to facilitate NOx reduction in the SCR device 16;

$NH3_{slip}$, which represents predicted NH3 slip from the SCR fault model in EQ. 2; and $\Theta_{OBD}$, which represents an ammonia storage capacity that has decreased to an OBD threshold level as defined before in EQ2

The actual amount of NOx that is consumed $NOx_{consumed}|actual$ during operation under the present conditions with the SCR device 16 operating in its actual, unknown state is compared with the predicted fault-related amount of NOx ($NOx_{consumed}|fault$) that is consumed during operation under the present conditions with the SCR device 16 operating at a fault state (330).

When the actual amount of NOx that is consumed $NOx_{consumed}|actual$ during operation under the present conditions with the SCR device 16 operating in its actual, unknown state is greater than the predicted fault-related amount of NOx ($NOx_{consumed}|fault$) that is consumed during operation under the present conditions with the SCR device 16 operating at a fault state (1), no fault is indicated (340).

When the actual amount of NOx that is consumed $NOx_{consumed}|actual$ during operation under the present conditions with the SCR device 16 operating in its actual, unknown state is less than or equal to the fault-related amount of NOx ($NOx_{consumed}|fault$) that is consumed during operation under the present conditions with the SCR device 16 operating at a fault state (0), a fault associated with the SCR device 16 is indicated (350) due to a corresponding decrease in the NOx conversion efficiency. In one embodiment, the threshold decrease in NOx conversion efficiency is associated with an increase in NOx emissions to a maximum permissible NOx emissions level that is 1.5 times the regulated standard for NOx emissions.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. An exhaust aftertreatment system for an internal combustion engine, comprising:
   a selective catalytic reduction (SCR) device fluidly coupled to an exhaust pipe of the internal combustion engine;
   an injection system disposed to inject reductant into the exhaust pipe upstream of the SCR device;
   a single ammonia sensor disposed to monitor an exhaust gas feedstream downstream of the SCR device;
   a controller in communication with the single ammonia sensor and the internal combustion engine, and operatively connected to the injection system, the controller including an instruction set that is executable to:
      command the injection system to inject reductant into the exhaust pipe upstream of the SCR device,
      monitor, via the single ammonia sensor, a magnitude of ammonia in the exhaust gas feedstream downstream of the SCR device,
      determine a parameter associated with emissions performance of the SCR device based only upon the magnitude of ammonia in the exhaust gas feedstream downstream of the SCR device, and
      detect a fault in the SCR device based upon the parameter associated with emissions performance.

2. The exhaust aftertreatment system of claim 1, wherein the instruction executable to determine a parameter associated with emissions performance of the SCR device based upon the magnitude of ammonia in the exhaust gas feedstream downstream of the SCR device comprises the instruction set executable to:
  integrate the magnitude of ammonia in the exhaust gas feedstream downstream of the SCR device monitored by the single ammonia sensor.

3. The exhaust aftertreatment system of claim 2, wherein the instruction set executable to detect a fault in the SCR device based upon the parameter associated with emissions performance comprises the instruction set executable to:
  execute a catalyst fault model, wherein the catalyst fault model determines an expected ammonia output from the SCR device with the SCR device being deteriorated to a level that is associated with a fault threshold,
  integrate the expected ammonia output from the SCR device from the catalyst fault model with the SCR device being deteriorated to the level that is associated with the fault threshold,
  compare the integrated magnitude of ammonia in the exhaust gas feedstream and the integrated expected ammonia output from the SCR device that is derived from the catalyst fault model, and
  detect a fault in the SCR device when the integrated magnitude of ammonia in the exhaust gas feedstream is greater than the integrated expected ammonia output from the SCR device that is derived from the catalyst fault model.

4. The exhaust aftertreatment system of claim 3, wherein the catalyst fault model that determines an expected ammonia output from the SCR device with the SCR device being deteriorated to a level that is associated with a fault threshold comprises the catalyst fault model being developed with the SCR device having an ammonia storage capacity that is at a threshold level associated with NOx conversion efficiency that is associated with a maximum permissible NOx emissions level.

5. The exhaust aftertreatment system of claim 1, wherein the instruction executable to determine a parameter associated with emissions performance of the SCR device based upon the magnitude of ammonia in the exhaust gas feedstream downstream of the SCR device comprises the instruction set executable to:
  monitor engine operation to determine an engine-out NOx rate,
  determine a reductant flowrate based upon the command to the injection system to inject reductant, and
  determine an ammonia coverage ratio and ammonia storage capacity for the SCR device based upon the commanded reductant flowrate, the engine-out NOx rate and a signal from the single ammonia sensor associated with the magnitude of ammonia in the exhaust gas feedstream downstream of the SCR device.

6. The exhaust aftertreatment system of claim 5, wherein the instruction set executable to detect a fault in the SCR device based upon the parameter associated with emissions performance comprises the instruction set executable to:
  compare the ammonia storage capacity for the SCR device with a threshold ammonia storage capacity; and
  detect a fault in the SCR device when the ammonia storage capacity for the SCR device is less than the threshold ammonia storage capacity.

7. The exhaust aftertreatment system of claim 5, wherein the instruction set executable to determine the ammonia coverage ratio and ammonia storage capacity for the SCR device based upon the commanded reductant flowrate, the engine-out NOx rate and the signal from the single ammonia sensor comprises the instruction set including a Kalman filter configured to generate estimates for the ammonia coverage ratio and the ammonia storage capacity based upon the commanded reductant flowrate, the engine-out NOx rate and the signal from the single ammonia sensor.

8. The exhaust aftertreatment system of claim 1, wherein the instruction executable to determine a parameter associated with emissions performance of the SCR device based upon the magnitude of ammonia in the exhaust gas feedstream downstream of the SCR device comprises the instruction set executable to:
  determine an amount of ammonia consumed in the SCR device; and
  determine an actual amount of NOx reduced in the SCR device based upon the amount of ammonia consumed in the SCR device employing a mass balance relationship.

9. The exhaust aftertreatment system of claim 8, wherein the instruction set executable to detect a fault in the SCR device based upon the parameter associated with emissions performance comprises the instruction set executable to:
  determine a fault-related amount of NOx reduced in the SCR device when the SCR device is operating at a fault state; and
  compare the fault-related amount of NOx and the actual amount of NOx reduced in the SCR device.

10. The exhaust aftertreatment system of claim 1, wherein the instruction set is further executable to:
  monitor engine operation:
  determine engine-out NOx emissions based upon the monitored engine operation; and
  determine NOx efficiency of the SCR device based upon the engine-out NOx emissions and the magnitude of ammonia in the exhaust gas feedstream downstream of the SCR device.

11. A method for monitoring an exhaust aftertreatment system for an internal combustion engine, wherein the exhaust aftertreatment system includes a selective catalytic reduction (SCR) device, an injection system disposed to inject reductant into an exhaust pipe upstream of the SCR device, and an ammonia sensor disposed to monitor an exhaust gas feedstream downstream of the SCR device, the method comprising:
  commanding the injection system to inject reductant into the exhaust pipe upstream of the SCR device;
  monitoring, via the single ammonia sensor, a magnitude of ammonia in the exhaust gas feedstream downstream of the SCR device;
  determining a parameter associated with emissions performance of the SCR device based only upon the magnitude of ammonia in the exhaust gas feedstream downstream of the SCR device; and
  detecting a fault in the SCR device based upon the parameter associated with emissions performance.

12. The method of claim 11, wherein determining the parameter associated with emissions performance of the SCR device based upon the magnitude of ammonia in the exhaust gas feedstream downstream of the SCR device comprises:
  integrating the magnitude of ammonia in the exhaust gas feedstream downstream of the SCR device monitored by the single ammonia sensor.

13. The method of claim 12, detecting a fault in the SCR device based upon the parameter associated with emissions performance comprises:
  executing a catalyst fault model, wherein the catalyst fault model determines an expected ammonia output from the SCR device with the SCR device being deteriorated to a level that is associated with a fault threshold;

integrating the expected ammonia output from the SCR device from the catalyst fault model with the SCR device being deteriorated to the level that is associated with the fault threshold;

comparing the integrated magnitude of ammonia in the exhaust gas feedstream and the integrated expected ammonia output from the SCR device that is derived from the catalyst fault model; and detecting a fault in the SCR device when the integrated magnitude of ammonia in the exhaust gas feedstream is greater than the integrated expected ammonia output from the SCR device that is derived from the catalyst fault model.

14. The method of claim 13, wherein the catalyst fault model that determines an expected ammonia output from the SCR device with the SCR device being deteriorated to a level that is associated with a fault threshold comprises the catalyst fault model having an ammonia storage capacity that is at a threshold level associated with NOx conversion efficiency that is associated with a maximum permissible NOx emissions level.

15. The method of claim 11, wherein determining a parameter associated with emissions performance of the SCR device based upon the magnitude of ammonia in the exhaust gas feedstream downstream of the SCR device comprises:

monitoring engine operation to determine an engine-out NOx rate;

determining a reductant flowrate based upon the command to the injection system to inject reductant; and determining an ammonia coverage ratio and ammonia storage capacity for the SCR device based upon the commanded reductant flowrate, the engine-out NOx rate and a signal from the ammonia sensor associated with the magnitude of ammonia in the exhaust gas feedstream downstream of the SCR device.

16. The method of claim 15, wherein detecting a fault in the SCR device based upon the parameter associated with emissions performance comprises:

comparing the ammonia storage capacity for the SCR device with a threshold ammonia storage capacity; and detecting a fault in the SCR device when the ammonia storage capacity for the SCR device is less than the threshold ammonia storage capacity.

17. The method of claim 15, wherein determining the ammonia coverage ratio and ammonia storage capacity for the SCR device based upon the commanded reductant flowrate, the engine-out NOx rate and the signal from the ammonia sensor comprises executing a Kalman filter that is configured to generate estimates for the ammonia coverage ratio and the ammonia storage capacity based upon the commanded reductant flowrate, the engine-out NOx rate and the signal from the ammonia sensor.

18. The method of claim 11, wherein determining a parameter associated with emissions performance of the SCR device based upon the magnitude of ammonia in the exhaust gas feedstream downstream of the SCR device comprises:

determining an amount of ammonia consumed in the SCR device; and determining an actual amount of NOx reduced in the SCR device based upon the amount of ammonia consumed in the SCR device employing a mass balance relationship.

19. The method of claim 18, wherein detecting a fault in the SCR device based upon the parameter associated with emissions performance comprises:

determining a fault-related amount of NOx reduced in the SCR device when the SCR device is operating at a fault state; and comparing the fault-related amount of NOx and the actual amount of NOx reduced in the SCR device.

20. The method of claim 11, further comprising:

monitoring engine operation;

determining engine-out NOx emissions based upon the monitored engine operation; and determining NOx efficiency of the SCR device based upon the engine-out NOx emissions and the magnitude of ammonia in the exhaust gas feedstream downstream of the SCR device.

* * * * *